Figure 1:
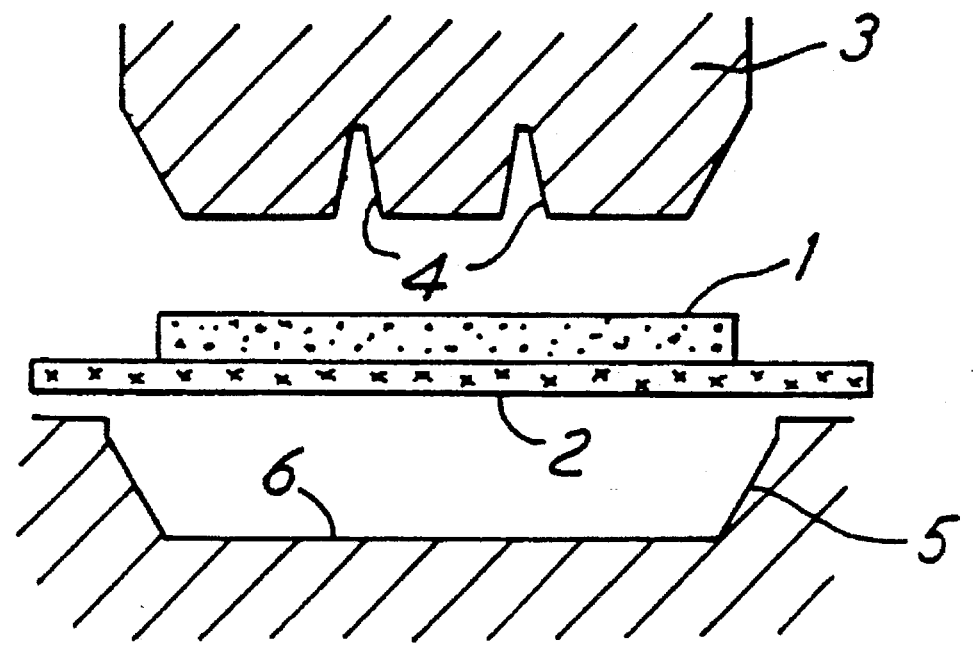

United States Patent [19]
Biggs et al.

[11] Patent Number: 5,558,931
[45] Date of Patent: Sep. 24, 1996

[54] FIBRE REINFORCED THERMOPLASTICS MATERIAL STRUCTURE

[75] Inventors: Ian S. Biggs, High Wycombe; Bronislaw Radvan, Flackwell Heath, both of England

[73] Assignee: The Wiggins Teape Group Limited, Basingstoke, England

[21] Appl. No.: 550,046

[22] Filed: Jul. 9, 1990

Related U.S. Application Data

[62] Division of Ser. No. 390,452, Aug. 3, 1989, Pat. No. 4,964,935, which is a continuation of Ser. No. 78,172, Jul. 27, 1987, abandoned.

[30] Foreign Application Priority Data

Jul. 31, 1986 [GB] United Kingdom ............ 8618726

[51] Int. Cl.⁶ ............... B32B 7/02; B32B 5/06; B32B 3/26; B32B 5/22
[52] U.S. Cl. ............ 428/218; 428/285; 428/301; 428/304.4; 428/317.9; 428/408; 428/902
[58] Field of Search ............ 428/304.4, 317.9, 428/902, 408, 218, 285, 301

[56] References Cited

U.S. PATENT DOCUMENTS

| | | |
|---|---|---|
| 1,875,018 | 8/1932 | Kliefoth . |
| 1,901,382 | 3/1933 | Stevenson . |

(List continued on next page.)

FOREIGN PATENT DOCUMENTS

| | | |
|---|---|---|
| 0071219 | 2/1983 | European Pat. Off. . |
| 0148760 | 7/1985 | European Pat. Off. . |
| 0148763 | 7/1985 | European Pat. Off. . |
| 0152994 | 8/1985 | European Pat. Off. . |
| 0173382 | 3/1986 | European Pat. Off. . |
| 3420195 | 12/1985 | Germany . |
| 56-37373 | 4/1981 | Japan . |
| 448138 | 6/1936 | United Kingdom . |
| 703023 | 1/1954 | United Kingdom . |
| 729381 | 5/1955 | United Kingdom . |
| 843154 | 8/1960 | United Kingdom . |
| 855132 | 11/1960 | United Kingdom . |
| 871117 | 6/1961 | United Kingdom . |
| 1008833 | 11/1965 | United Kingdom . |
| 1058932 | 2/1967 | United Kingdom . |
| 1110659 | 4/1968 | United Kingdom . |
| 1113792 | 5/1968 | United Kingdom . |
| 1129757 | 10/1968 | United Kingdom . |
| 1133606 | 11/1968 | United Kingdom . |
| 1134785 | 11/1968 | United Kingdom . |
| 1198324 | 7/1970 | United Kingdom . |
| 1204039 | 9/1970 | United Kingdom . |
| 1230789 | 5/1971 | United Kingdom . |
| 1231937 | 5/1971 | United Kingdom . |
| 1263812 | 2/1972 | United Kingdom . |
| 1305982 | 2/1973 | United Kingdom . |
| 1306145 | 2/1973 | United Kingdom . |
| 1329409 | 9/1973 | United Kingdom . |
| 1330485 | 9/1973 | United Kingdom . |

(List continued on next page.)

OTHER PUBLICATIONS

1004 Abstracts Bulletin of the Institute of Paper Chemistry, vol. 53 (1982) Aug. No. 2, Appleton, Wisconsin, USA.
"Polymer Processing", James M. McKelvey, 1962.
"Fibre Foam", Turner & Cogswell, 1976, presented at VIIth International Congress on Rheology in Sweden, Aug. 23–Aug. 27, 1976.
"Paints and varnishes—Determination of flow time by use of flow cups", International Standard ISO 2431, 1984.
"Part A6. Determination of flow time by use of flow cups", British Standards Institution, 1984.
Kunststoffe, vol. 75, No. 8, Aug. 1985, pp. 497–503.

*Primary Examiner*—James Withers
*Attorney, Agent, or Firm*—Burns, Doane, Swecker & Mathis, L.L.P.

[57] ABSTRACT

A fibre reinforced thermoplastics material structure having a first layer which is fully consolidated with uniformly dispersed fibres and a second layer which is formed as an absorbent matrix.

15 Claims, 1 Drawing Sheet

U.S. PATENT DOCUMENTS

| | | |
|---|---|---|
| 2,388,187 | 10/1945 | Salle . |
| 2,653,870 | 9/1953 | Kast . |
| 2,715,755 | 8/1955 | Jones . |
| 2,795,524 | 6/1957 | Rodman . |
| 2,892,107 | 6/1959 | Williams et al. . |
| 2,962,414 | 11/1960 | Arledter . |
| 3,042,574 | 7/1962 | Hochberg . |
| 3,200,181 | 8/1965 | Rudloff . |
| 3,216,841 | 11/1965 | Thellmann . |
| 3,396,062 | 8/1968 | White . |
| 3,428,518 | 2/1969 | Schafer . |
| 3,452,128 | 6/1969 | Rains . |
| 3,489,827 | 1/1970 | Mueller et al. . |
| 3,494,824 | 2/1970 | Roberts . |
| 3,573,158 | 3/1971 | Pall et al. . |
| 3,607,500 | 9/1971 | Field . |
| 3,621,092 | 11/1971 | Hofer . |
| 3,734,985 | 5/1973 | Greenberg . |
| 3,832,115 | 8/1974 | Ettel . |
| 3,837,986 | 9/1974 | Gorter et al. . |
| 3,850,723 | 11/1974 | Ackley . |
| 3,856,614 | 12/1974 | Susuki et al. . |
| 3,865,661 | 2/1975 | Hata et al. . |
| 3,873,336 | 3/1975 | Lambert et al. . |
| 3,897,533 | 7/1975 | Hani et al. . |
| 3,903,343 | 9/1975 | Pfaff . |
| 3,930,917 | 1/1976 | Esakov et al. . |
| 3,975,483 | 8/1976 | Rudloff . |
| 3,980,511 | 9/1976 | Proucelle . |
| 3,980,613 | 9/1976 | Bachot et al. . |
| 3,981,738 | 9/1976 | Shen . |
| 4,007,083 | 2/1977 | Ring et al. . |
| 4,044,188 | 8/1977 | Segal . |
| 4,081,318 | 3/1978 | Wietsma . |
| 4,104,340 | 8/1978 | Ward . |
| 4,104,435 | 8/1978 | Ballesteros . |
| 4,153,760 | 5/1979 | Sundberg et al. . |
| 4,159,294 | 6/1979 | Oishi et al. . |
| 4,178,411 | 12/1979 | Cole et al. . |
| 4,234,652 | 11/1980 | Vanoni et al. . |
| 4,242,404 | 12/1980 | Bondoc et al. . |
| 4,273,981 | 6/1981 | Nopper . |
| 4,286,977 | 9/1981 | Klein . |
| 4,327,164 | 4/1982 | Feinberg et al. . |
| 4,339,490 | 7/1982 | Yoshioka et al. . |
| 4,359,132 | 11/1982 | Parker et al. . |
| 4,362,778 | 12/1982 | Andersson et al. . |
| 4,386,943 | 6/1983 | Gumbel et al. . |
| 4,393,154 | 7/1983 | Tyler et al. . |
| 4,399,085 | 8/1983 | Belbin et al. . |
| 4,426,470 | 1/1984 | Wessling et al. . |
| 4,440,819 | 4/1984 | Rosser et al. . |
| 4,451,539 | 5/1984 | Vallee et al. . |
| 4,469,543 | 9/1984 | Segal et al. . |
| 4,481,248 | 11/1984 | Fraige . |
| 4,495,238 | 1/1985 | Adiletta . |
| 4,498,957 | 2/1985 | Sasaki et al. . |
| 4,503,116 | 3/1985 | Lapidus . |
| 4,508,777 | 4/1985 | Yamamoto et al. . |
| 4,512,836 | 4/1985 | Tucci . |
| 4,543,288 | 9/1985 | Radvan et al. . |
| 4,555,426 | 11/1985 | Roth et al. . |
| 4,562,033 | 12/1985 | Johnson et al. . |
| 4,568,581 | 2/1986 | Peoples, Jr. . |
| 4,595,617 | 6/1986 | Bogdany . |
| 4,596,736 | 6/1986 | Eichhorn et al. ................... 428/317.9 |
| 4,643,940 | 2/1987 | Shaw et al. . |
| 4,649,014 | 3/1987 | Tochikawa . |
| 4,659,528 | 4/1987 | Plowman et al. . |
| 4,670,331 | 6/1987 | Radvan et al. . |
| 4,690,860 | 9/1987 | Radvan et al. . |
| 4,719,039 | 1/1988 | Leonardi . |
| 4,734,321 | 3/1988 | Radvan et al. . |
| 4,773,225 | 9/1988 | Farley et al. . |
| 4,882,114 | 11/1989 | Radvan et al. . |
| B1 4,543,288 | 1/1988 | Radvan et al. . |

FOREIGN PATENT DOCUMENTS

| | | |
|---|---|---|
| 1348896 | 3/1974 | United Kingdom . |
| 1353477 | 5/1974 | United Kingdom . |
| 1373782 | 11/1974 | United Kingdom . |
| 1412642 | 11/1975 | United Kingdom . |
| 1424682 | 2/1976 | United Kingdom . |
| 1519310 | 7/1978 | United Kingdom . |
| 2051170 | 1/1981 | United Kingdom . |
| 2065016 | 6/1981 | United Kingdom . |
| 2093474 | 9/1982 | United Kingdom . |
| 2096195 | 10/1982 | United Kingdom . |
| 2147850 | 5/1985 | United Kingdom . |

U.S. Patent     Sep. 24, 1996     5,558,931

FIBRE REINFORCED THERMOPLASTICS MATERIAL STRUCTURE

This application is a divisional of application Ser. No. 07/390,452, filed Aug. 3, 1989 now U.S. Pat. No. 4,964,935, which is a continuation of application Ser. No. 078,172 filed Jul. 27, 1987 now abandoned.

This invention relates to a fibre reinforced thermoplastics material structure and to a method of making such a structure, the resulting article having flow moulded detail on one side and an open, porous structure on the other. This open structure can be subsequently impregnated with a thermosetting resin to impart desirable features.

As described in European Patent Application 85300034.7 (European Publication No. 0 148 763), the subject matter disclosed in that application being incorporated by reference herein, consolidated thermoplastic material reinforced with long, stiff fibres will expand when heated to a temperature such that the viscosity of the thermoplastic material is sufficiently reduced to allow movement of the fibres; which occurs due to release of stresses in the fibre network. This phenomenon occurs to a varying extent depending on the type/grade of thermoplastic, the proportion of fibre, and the type/dimensions of the fibre.

When such a material is heated and expanded it can be moulded to shape in two ways:

1) Conventionally, whereby a charge of material is placed in the mould, which when closed, forces the material to flow and fill completely the mould cavity. An article produced in this way is fully consolidated (densified) and can be made to contain intricate detail fully reinforced with glass fibre. Depending on the intended application such an article is either ready for use or it can be coated or painted with suitable materials. However, it cannot be impregnated due to its fully densified state.

2) A sheet of hot, expanded material is inserted to cover the lower tool of the mould. The mass of this sheet is insufficient to fill the mould in a fully densified state so that when the mould is closed to the limit of its travel a semi-consolidated form is produced having a residual porosity. This porous nature can be used as a means whereby the product can be impregnated with a liquid resin if so desired. However, a disadvantage of this forming technique is that flow moulded details (such as deep ribs) cannot be formed without losing porosity in the region of flow. Thus if uniform impregnation is required on one surface of the article some sacrifice in the extent of fibre reinforced moulded detail on the reverse side may be necessary.

The invention disclosed herein describes a means whereby it is possible to produce an article having the attributes of both the above methods; i.e. an article having a flow moulded features, such as fibre reinforced ribs, on one side whilst retaining the ability to uniformly absorb liquid resin on the other. It has also been discovered that articles produced by this invention are free of sink marks, which is a problem feature of articles produced by the method 1 above.

According to the present invention a fibre reinforced thermoplastics material structure comprises a first layer which is fully consolidated with uniformly dispersed fibres and a second layer which is formed as an absorbent matrix.

Thus, the absorbent matrix can be invested with a thermosetting or thermoplastics material to achieve the result set forth above.

The invention includes a method of making a fibre reinforced plastics structure as set forth above which includes laminating a first sheet of fibre reinforced thermoplastics material which will consolidate when cooled after subjection to pressure at a temperature above the melt temperature of the thermoplastic with a second sheet of fibre reinforced thermoplastics material which will remain substantially unconsolidated and porous when cooled after subjection to said temperature and pressure, and shaping the laminate in a mould at said temperature and pressure so that the first sheet flows to the shape of the mould and is consolidated and bonded to the second sheet which is shaped by the mould and at least a portion of which remains substantially unconsolidated and porous.

Preferably a substantial proportion of the fibres are between 7 and 50 millimeters long and 13 microns or less in diameter. Conveniently, the fibres are also in the form of single discrete glass fibres. Such fibres are usually provided bonded together into chopped strand bundles and these must be broken down into single fibres before the sheet is formed.

Where the fibres are required to confer structural strength in the laminate, the discrete glass fibres should not be shorter than about 7 millimeters or of a diameter greater than 13 microns, since such fibres which are longer do not adequately reinforce the plastics matrix and fibres which are of greater diameter do not so efficiently reinforce the matrix. Single fibres of other materials having a reinforcement efficiency at least as high as glass fibres may, alternatively, be used.

A high modulus of elasticity is to be taken as meaning a modulus of elasticity substantially higher than that of the sheet. Fibres falling into this category include glass, carbon and ceramic fibres and fibres such as the aramid fibres sold under the trade names Kevlar and Nomex and will generally include any fibre having a modulus higher than 10,000 Mega Pascals.

In order to achieve the result set forth above the method may include using a second sheet of material which has been expanded as described in European Patent Publication No. 0 148 763 above referred to, or in which the proportion of fibres is above that which is possible to achieve full consolidation.

This therefore makes use of the fact that in any rigid fibre (for example glass)/polymer combination there is, due to the packing density of the fibres, a critical fibre concentration above which full consolidation or densification of the structure is impossible under normal conditions of pressing and moulding.

The method may include investing the porous side portion with a thermosetting or thermoplastic plastics material as proposed in European Patent Application No. 85300035.4 (European Publication No. 0 152 994) the subject matter disclosed in that Application being incorporated by reference herein.

If desired the thermosetting or thermoplastic plastics material can be invested in the mould.

Thus the thermosetting plastics material can be placed in the mould in a liquid state before investing the porous side. If it is to be invested with a thermoplastics material this can alternatively be provided in the form of a third sheet prior to investment.

The thermoplastic materials may for example be of polyethylene, polypropylene, polystyrene, acrylonitrile—butadiene—styrene, polyethyleneterephthalate polybutyleneterephthalate or polyvinylchloride, both plasticised or unplasticised, or an alloy or blends of these materials with each other or other polyamide materials. Other suitable thermoplastics include polyphenylene ether or polycarbonates or polyestercarbonates or thermoplastic polyesters or polyetherimides or acrylonitrile—butylacrylate—styrene polymers or amorphous nylon or polyarylene ether ketone or alloys or blends of these materials with each other or other polymeric materials.

The fibre content of the first sheet is preferably less than 30% and the second sheet more than 60%.

With a glass fibre content of more than 60%, that is a material having a critical fibre concentration above which full consolidation and densification of the structure is usually impossible under normal conditions of pressure and moulding, it is difficult to flow mould into intricate shapes but by combining such material with an easily flow mouldable material such as that set forth above, the desired effect can be achieved.

Figure 2:
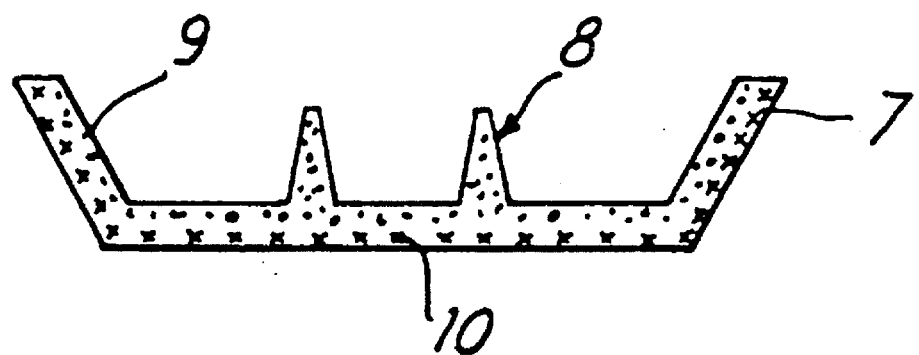

The invention can be performed in various ways and various methods for producing a glass fibre reinforced thermoplastics article and articles made by the methods will now be described by way of example and with reference to the accompanying drawings in which:

FIG. 1 is a diagrammatic view of a mould with a laminate material in it ready for mould; and, FIG. 2 is a diagrammatic cross-section showing an article produced by the mould shown in FIG. 1.

As shown in FIG. 1 the fibre reinforced thermoplastics material to be moulded comprises an upper sheet 1 of a fibre reinforced thermoplastics material which has glass fibres of a length of 13 mm and a diameter of 11 µm in a polypropylene matrix. The content of glass fibres is approximately 25%. This sheet is laminated on top of a second sheet 2 which is of similar content to sheet 1 but which has a much higher glass fibre content, of approximately 80%. Due to the packing density of the fibres it will be impossible, under normal conditions of pressing and moulding, to achieve a consolidated structure with this second sheet.

The mould in which the sheets are to be shaped into an article has an upper tool 3 provided with shaped indentations 4 and a lower tool 5 having a cavity 6.

The laminated sheets, which may have been preheated to a predetermined temperature are placed in the mould which is closed to a fixed stop. The high glass content material in sheet 2 conforms to the cavity 6 of the lower tool 5 whilst the low glass content material in sheet 1 is forced to flow into the indentations 4 and take up the shape of the upper tool 3. There is some intermingling of the materials at the boundary layer which ensures adequate bonding.

After cooling and deflashing, an article as shown in FIG. 2 is produced. The article, indicated by reference numeral 7, has an upper portion 8, formed from the sheet 1, of polypropylene which has become fully consolidated in which the uniformly dispersed glass fibre is indicated by reference numeral 9. The lower portion of the article, which is formed from the sheet 2 is indicated by reference numeral 10, this portion being porous and unconsolidated.

The article can be used in various ways, for example, it can be bonded to another article by utilizing the porous structure as a key for an adhesive or molten thermoplastic which unifies the two articles. Alternatively it can be made into a unitary article itself by filling the porous structure. In order to do this a thermosetting resin can be poured or injected into the lower tool 5 (in this particular configuration) and the mould closed again so that the resin is forced into the porous, absorbent layer 10. After the curing the article is removed and possesses the attributes of a fully reinforced moulded thermoplastic on the upper side and a reinforced thermoset resin on the other. Additionally, sink marks are obscured, even before the impregnation of the porous layer with a liquid resin.

This construction enables fast forming of flow moulded detail on one side of the article combined with a smooth thermoset layer on the other side. Thus, the article can have a good finish and have one surface capable of withstanding high temperature and with sufficient detail on the other surface for stiffening or other requirements.

Table 1 specifies the theoretical and measured void contents of unconsolidated material having a glass content above the critical level at which consolidation can be achieved. The void content of the material, which subsequently renders it capable of impregnation was both calculated theoretically and determined by an oil absorption test. It will be seen that there was good agreement between the two modes of evaluation.

TABLE 1

Void content of unconsolidated glass fibre/particulate thermoplastic composite sheet materials above the critical glass content at which consolidation can be achieved

| Glass Content of fibres 12 mm long 11 microns diameter | 60% | 70% | 80% | 90% |
|---|---|---|---|---|
| Grammage (g/m$^2$) | 1114 | 1090 | 1099 | 1103 |
| Bulk (cc/g) | 0.88 | 1.12 | 1.39 | 1.66 |
| *Theoretical Bulk (cc/g) | 0.67 | 0.60 | 0.53 | 0.46 |
| **Theoretical Void Content (%) | 24 | 46 | 62 | 72 |
| + Oil Absorption (g/m$^2$) | 242.3 | 582.3 | 1075.8 | 1751.0 |
| ++ Void Content (%) | 26 | 54 | 67 | 79 |

*Density of glass fibre content - 2.55 g/cc
Density of thermoplastic (polypropylene) content - 0.91 g/cc
**Theoretical void Content based on measured sheet thickness and theoretical bulk values
+ Density of oil used was 0.9 g/cc
++ Void Content based on volume of oil pick up Table 2 sets out 8 examples of laminates formed from high and low glass content starting materials as specified in Note 1 of the Table. It will be seen from the oil absorption test carried out on the side of each laminate formed from the high glass content component that the oil absorption (and therefore the void content) values were substantially consistent with the purpose for which the laminate is to be used.

TABLE 2

Lamination of High and Low Glass Content Materials

| | Low Glass Content Material | | High Glass Content Material | | | Final Press Gap (mm) | Laminate formed from High and Low Glass Content Material | | | |
|---|---|---|---|---|---|---|---|---|---|---|
| | | | | | | | | | High Glass Content Layer | |
| | | | | | Oil | | Total | Total | Estimated | Oil |
| Example | Substance g/m² | Thickness (mm) | Substance g/m² | Thickness (mm) | Absorption (g/m²) | | Substance g/m² | Thickness (mm) | Thickness (mm) | Absorption (g/m²) |
| 1 | 2090 | 2.05 | 2040 | 2.82 | 1517 | 3.3 | 3668 | 3.25 | 1.30 | 715 |
| 2 | 2090 | 2.05 | 1090 | 1.46 | 1076 | 3 | 3040 | 2.91 | 1.10 | 681 |
| 3 | 2090 | 2.05 | 1090 | 1.46 | 1076 | 2 | 2440 | 2.09 | 0.56 | 182 |
| 4 | 4180 | 4.10 | 1090 | 1.46 | 1076 | 3 | 3239 | 2.92 | 0.67 | 354 |
| 5 | 4180 | 4.10 | 493 | 0.72 | 567 | 3 | 3000 | 2.78 | 0.17 | 233 |
| 6 | 2090 | 2.05 | 493 | 0.72 | 567 | 2 | 2134 | 1.92 | 0.29 | 152 |
| 7 | 2090 | 2.05 | 248 | 0.43 | 276 | 2 | 2026 | 1.87 | 0.19 | 79 |
| 8 | 4180 | 4.10 | 248 | 0.43 | 276 | 2 | 2081 | 1.90 | 0.16 | 47 |

Notes:
1. Low Glass Content Materials =
25% glass fibre 12 mm long 11 microns diameter, 75% Polypropylene powder by weight.
High Glass Content Materials =
80% glass fibre 12 mm long, 11 microns diameter, 20% Polypropylene powder by weight.
2. The estimated thickness of layer derived from High Glass Content Material was made from photographs of cross sections.
3. The press temperature was set to 100° C. to facilitate flow moulding flow moulding of the materials when pressure was applied.

EXAMPLE 9

Unconsolidated samples of 70% glass fibre 12 millimeters long, 11 microns diameter/30% polypropylene powder material having a substance of 1000 g/m² and 25% glass fibre 12 millimeters long, 11 microns diameter/75% polypropylene powder material having a substance of 2000 g/m² were cut to 22 cms diameter, which was the effective diameter of the mould. The samples were oven heated at 200° C. for 7 minutes and placed in a press mould at a temperature of 100° C. with the 25% glass content material uppermost. On closing the press to a 3 mm final gap, a dish was formed having an absorbent lower surface and moulded ribs and bosses in the upper surface. The press was raised and cooled to a temperature of 50° C., 40 g of a thermosetting resin (sold under the Trade name Modar 824 LT by ICI Ltd.) were poured into the mould and the press reclosed, thus forcing the resin into the absorbent layer, with excess resin being forced out of the tool. After curing, the dish was weighed and calculated to have picked up 18 grams of resin, which imparted a smooth, glossy finish to the lower surface.

EXAMPLE 10

Example 9 was repeated with unconsolidated sheet material samples of 80% glass fibre 12 millimeters long 11 microns diameter/20% polypropylene powder having a substance of 1000 g/m² and 25% glass fibre 12 millimeters long 11 microns diameter/75% polypropylene powder material having a substance of 2000 g/m². A 24 g resin pick up resulted, with the lower surface having a finish similar to that of Example 9.

EXAMPLE 11

The following samples were prepared.
Two discs 23 centimeters in diameter and having a substance of 2000 grams per square meter of unconsolidated permeable sheet like material comprising 25% glass fibres 12 millimeters long and 11 microns in diameter and 75% polypropylene powder, bonded together.

One disc 21 centimeters in diameter and having a substance of 500 grams per square meter of unconsolidated permeable sheet like material comprising 80% glass fibres 12 millimeters long and 11 microns in diameter, and 20% polypropylene powder, bonded together.

One disc 17 centimeters in diameter of polycarbonate film 1 millimeter thick, sold under the trade name LEXAN by General Electric Co., which acts as a third sheet.

The samples were heated in an oven at 205° C. for seven and a half minutes and then placed together, in the order listed, in a press mould at a temperature of 100° C. The press was then closed and a pressure of 2000 lbs per square inch applied for one minute. The resulting laminated moulding proved to be substantially bonded.

EXAMPLE 12

The procedure of Example 11 was repeated, but with a polycarbonate film sample 21 centimeters in diameter which replaced the disc of 17 centimeters in diameter in Example 11. The resulting laminated moulding was found to have bonded well with the polycarbonate film partially enveloping the side edges of the moulding without creases having been formed.

EXAMPLE 13

Samples were prepared as in Example 11, and the same procedure followed except that the samples comprised of polycarbonate were heated separately at 250° C. for four minutes and the bottom platten of the press mould (in contact with the polycarbonate film) was maintained at 140° C. during moulding. The procedure was then repeated twice with unconsolidated permeable samples comprising polycarbonate had glass fibre contents of 70% and 60% respectively.

The resulting laminated mouldings in all three cases were found to have bonded together with, and exhibited a greater resistance to forced delamination, than the mouldings of Examples 11 and 12.

EXAMPLE 14

38 centimeter square samples were prepared from the following materials.

Unconsolidated permeable sheet like material having a substance of 2000 grams per square meter and comprising 25% glass fibres 12 millimeters long and 11 microns in diameter and 75% polypropylene powder, bonded together.

Unconsolidated permeable sheet like material having a substance of 500 grams per square meter and comprising 80% glass fibres 12 millimeters long and 11 microns in diameter and 20% polypropylene powder, bonded together.

Polycarbonate film sold under the trade name LEXAN by General Electric Co. in thicknesses of 1 millimeter, 0.5 millimeter and 0.25 millimeter.

The two unconsolidated samples were heated to 205° C. for seven and a half minutes in an oven, and the 1 millimeter thick polycarbonate, film to 250° C. for four minutes. The samples were then placed in a platen press at a temperature of 100° C. in the sequence listed and a pressure of 2000 lbs per square inch applied for 1 minute.

The foregoing procedure was then repeated on a second and a third occasion in which the 0.5 millimeter and 0.25 millimeter polycarbonate films respectively were substituted for the 1 millimeter film.

A good bond between the three components of each of the resulting laminates was found to have been formed.

EXAMPLE 15

The three laminates produced in Example 14 were cut to a diameter of 22 centimeters. A 15 centimeter diameter piece of unconsolidated material of the kind from which the first sample was cut in Example 14 was then laid on each of the circular laminates.

The resulting assemblies were in sequence heated to 205° C. for seven and a half minutes and subjected to press moulding in a mould heated to 120° C. at 2000 pounds per square inch for 1 minute.

The three resulting mouldings were found to be well formed and well bonded.

EXAMPLE 16

Samples were first prepared for moulding as an in Example 9. The first sample, comprising 70% glass fibre 12 millimeters long 11 microns, diameter and 30% polypropylene was then oven heated to 200° C. for seven minutes and then placed in the same press mould as had been used in Example 9. On closure of the mould, the structure of the sample was compacted so that the molten polypropylene wetted out the surfaces of the glass fibres. As the press was raised, the resilience of the glass fibres caused the wetted out fibrous structure substantially to reassume its porous configuration prior to pressing.

After the first sample had sufficiently cooled to be handled, it was removed from the mould and allowed to cool fully. 15 g of thermosetting resin sold under the trade name Modar 824 LT by ICI Ltd. were then poured into the mould add the first sample then returned to the mould. The press was then closed so that the thermosetting resin invested the pores in the lower surface of the sample. After curing, this produced a dish-like structure having a smooth and glossy lower surface, and a tangled open fibrous upper surface. The structure thus produced can be removed from the mould for storage and integral moulding, at a later date, with a second fibre reinforced sheet comprising a substantially higher proportion of thermoplastic, or it may be integrally moulded with such a sheet immediately, as described below.

Whilst the thermosetting resin was curing in the mould, the second sample comprising 25% glass fibre 12 millimeters long 11 microns diameter and 75% polypropylene was heated to 200° C. for seven minutes and placed in the mould on top of the previously moulded first sample. The press was then closed for a second time so as to cause the hot material at the lower face of the second sample to integrate with the tangled fibrous upper surface of the first sample already in the mould. Because of the relatively high thermoplastic content of the second sample, it also flow moulded without difficulty to conform to the profile of the upper portion of the mould.

We claim:

1. A fibre reinforced plastics structure having a plurality of layers, including a first layer which is fully consolidated with uniformly dispersed fibres and a second layer which is formed as an absorbent matrix, the first layer comprising a first sheet of fibre reinforced thermoplastics material which will consolidate when cooled after subjection to pressure at a temperature above the melt temperature of the thermoplastics material of said first sheet and the second layer comprising a second sheet of fibre reinforced thermoplastics material which will remain porous when cooled after subjection to pressure at a temperature above the melt temperature of the thermoplastics material of the second sheet and which has been heated to a temperature above that at which the thermoplastics material of both of said sheets have been caused to melt and subjected to pressure in a mould to bond said first and second sheets together.

2. A fibre reinforced plastics structure as claimed in claim 1 in which the absorbent matrix is invested with a thermosetting of thermoplastic plastics material.

3. A fibre reinforced plastics structure as claimed in claim 1 in which a substantial proportion of the fibres are between 7 and 50 millimeters long and 13 microns or less in diameter.

4. A fibre reinforced plastics structure as claimed in claim 3 in which the fibres are in the form of single discrete fibres.

5. A fibre reinforced plastics structure as claimed in claim 1 in which the reinforcing fibres have a high modulus of elasticity.

6. A fibre reinforced plastics structure as claimed in claim 1 in which the said second sheet of material has been expanded prior to bonding.

7. A fibre reinforced plastics structure as claimed in claim 2 in which the said porous portion is invested with a thermoplastics material which was provided as a third sheet and integrated with said laminate in said mould.

8. A fibre reinforced plastics structure as claimed in claim 7 in which at least part of one side edge of second sheet is invested with the said thermoplastics material from said third sheet.

9. A fibre reinforced plastics structure as claimed in claim 1 in which the fibres are glass fibres.

10. A fibre reinforced plastics structure as claimed in claim 9 in which the glass fibre content in the first sheet is less than 30%.

11. A fibre reinforced plastics structure as claimed in claim 9 in which the glass fibre content in the second sheet is more than 60%.

12. A fibre reinforced plastics structure as claimed in claim 1 in which the thermoplastics material is polyethylene, polypropylene, polystyrene, acrylonitrile-styrenebutadiene, polyethyleneterephthalate, polybutyleneterephthalate or polyvinylchloride, both plasticised or unplasticised, or an alloy and blends of these materials with each other or other polymeric materials.

13. A fibre reinforced plastics structure as claimed in claim 1 in which the thermoplastics materials are polyphenylene ether or polycarbonates or polyestercarbonates or thermoplastic polyesters or polyetherimides or acrylonitrile-butylacrylate-styrene polymers or amorphous nylon or polyarylene ether ketone or alloys or blends of these materials with each other or other polymeric materials.

14. A fibre reinforced plastics structure as claimed in claim 1 in which said second sheet of material has a fibre content above that which is possible to achieve full consolidation.

15. A fibre reinforced plastics structure having a plurality of layers, including a first layer which is fully consolidated with uniformly dispersed fibres and a second layer which is formed as an absorbent matrix the first layer comprising a first sheet of fibre reinforced thermoplastics material which will consolidate when cooled after subjection to pressure at a temperature above the melt temperature of the thermoplastics material of said first sheet and the second layer comprising a second sheet of fibre reinforced thermoplastics material which will remain porous when cooled after subjection to pressure at a temperature above the melt temperature of the thermoplastics material of the second sheet and which has been heated to a temperature above that at which the thermoplastics material of both of said sheets have been caused to melt and subjected to pressure in a mould to bond said first and second sheets together in which the first layer has a fibre density which is less than a critical fibre concentration, and the second layer has a fibre density which is greater than the critical fibre concentration, said critical fibre concentration representing a fibre density above which full consolidation of the structure is impossible under normal conditions of pressing and moulding.

* * * * *